Jan. 19, 1954     E. A. VOGEL     2,666,258
SHEARS WITH REPLACEABLE BLADES
Filed March 15, 1951
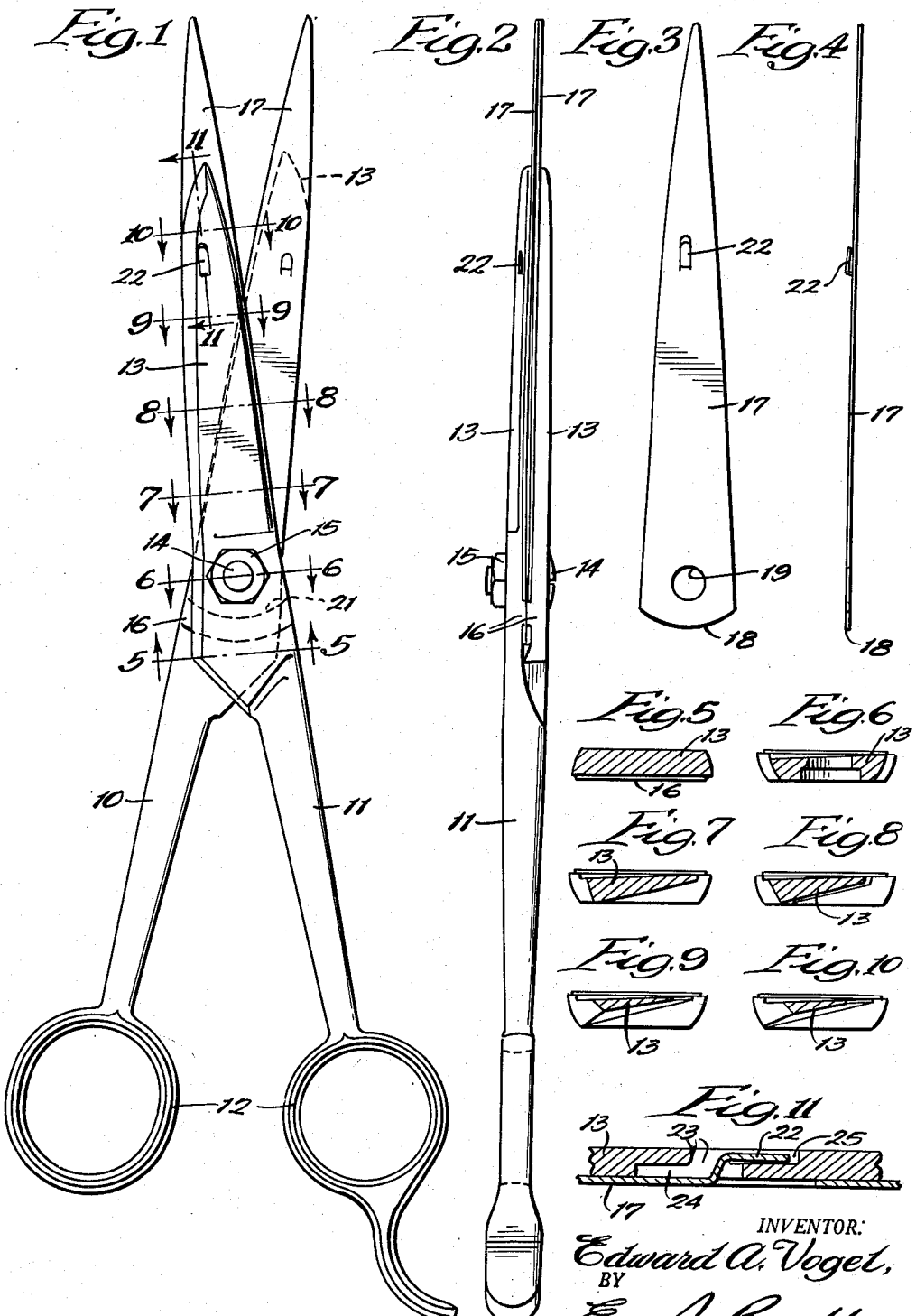
INVENTOR:
Edward A. Vogel,
BY
E. S. Brith,
ATTORNEY.

Patented Jan. 19, 1954

2,666,258

UNITED STATES PATENT OFFICE 2,666,258

SHEARS WITH REPLACEABLE BLADES

Edward A. Vogel, Glen Ellyn, Ill., assignor to K. A. Vogel Sons, Chicago, Ill., a corporation of Illinois Application March 15, 1951, Serial No. 215,701

1 Claim. (Cl. 30—349)

This invention relates to shears with replaceable blades, and more particularly to shears in which the cutting blades can be easily and quickly removed and replaced.

Shears for accurate cutting, such as barber shears, cloth shears and the like, are extremely difficult to sharpen properly. In the normal sharpening of such shears, the faces of the blades are ground to a concave curve and with a twist therein from end to end. Thereafter, one edge of each blade is ground on a bevel to form the cutting edge. This operation and particularly the grinding of the faces, requires an extremely high degree of skill and is a relatively slow and tedious operation.

Attempts have been made heretofore to provide shears with detachable blades which can be discarded and replaced to eliminate the necessity of grinding. These constructions, however, have been relatively complicated and expensive in their efforts to provide a detachable blade following exactly the contour of a properly ground pair of shears. Therefore they have either been too expensive to be practical or have not provided a sufficiently good cutting action to be acceptable.

It is one of the objects of the present invention to provide shears in which the blades can be easily and quickly detached and attached for rapid and easy replacement.

Another object is to provide shears in which the blades are of a very simple and inexpensive construction so that it is commercially practical to discard them without resharpening.

According to one feature of the invention, the blades are formed of flat strips of steel or the like, with no special bending or twisting required so that they are very inexpensive. According to another feature, the blades are bent longitudinally when mounted on the frames to provide a proper cutting action but remain flat transversely of their length and with a constant angle or rake from end to end.

A further object is to provide shears including a simple and inexpensive means for securing the blades firmly to the frames.

The above and other objects and features of the invention will be more readily apparent from the following description when read in connection with the accompanying drawing in which Figure 1 is a side elevation of a pair of shears embodying the invention;

Figure 2 is an edge elevation;

Figure 3 is a face view of a replaceable blade;

Figure 4 is an edge view of the blade;

Figures 5 through 10 are sections on the lines 5—5 through 10—10 respectively on Figure 1, and Figure 11 is an enlarged longitudinal section on the line 11—11 of Figure 1.

The shears as shown, comprise two frame members 10 and 11 which may be formed as die castings or in any other desired manner. Since the frames serve only as carriers for the blades they do not need to be of high-grade steel such as that normally used in the manufacture of shears, but can be relatively inexpensive and soft material as desired.

Each frame member is provided with a handle portion 12 and a blade portion 13 integrally connected to the handle portion. The blade and handle portions can be of any desired size or shape depending upon the type of shears, and are illustrated as being formed in a manner similar to conventional barber shears. Intermediate their ends the frames are connected by a pivot pin 14 extending through openings in the frames and secured by a nut 15.

As best seen in Figure 2, the blade portions of the frames are recessed throughout most of their length leaving lands 16 on which the frames ride during pivoting thereof with the outer plate portions normally spaced slightly from each other. Also, as best seen in Figure 2, the blade portions 13 are curved longitudinally so that their adjacent faces are concave. The faces, however, as shown in Figures 5 through 10, are flat transversely and lie at a slight angle to the general plane of the shears to provide the desired rake.

Each frame member is adapted to carry a detachable cutting blade which, as best seen in Figures 3 and 4, is formed by a flat elongated strip of steel or the like, 17. The blades are cut or punched to provide the desired tapered shape and size and terminate at their larger ends in convex edges 18. Adjacent to the edges 18 the blades are formed with openings 19 through which the pivot pin 14 may extend when the blades are assembled in frames. As indicated in Figure 1, the lands 16 terminate in concave shoulders 21 against which the convex ends of the blades abut to assist in holding the blades in place.

To secure the blades to the frame members in addition to the securing effect of the pivot pin, each blade is formed with long integral fingers projecting above its plane and lying generally parallel to the blade. In forming the blades they can be punched or cut to the desired shape and can have the fingers 22 punched therefrom before hardening. The blades may then be hardened and may have their cutting edges ground on a bevel to form a relatively sharp edge. The material of the blades can be quite thin similar to that normally used in razor blades but preferably of a spring steel somewhat softer than the usual razor blade to produce the desired cutting action.

The fingers 22 on the blades are adapted to project through openings in the blade portions 13 which are formed as best seen in Figure 11. As there shown, each of the blade portions is formed with an offset opening 23 defined by a short outer shoulder 24 and a longer inner shoulder 25 of a size to fit under the finger 22 as shown.

To attach the blades to the frame members, the pivot pin 14 is removed and the frame members are separated. A blade 17 is then laid against the flat inner face of each blade member and the finger 22 thereof is inserted in the opening 23. The blade is then slid toward the outer end of the blade portion to move the finger over the shoulder 25 so that the finger will hold the blade tightly against the inner surface of the blade portion. With the blade in this position, the opening 19 therein will register with the pivot pin openings in the frames and the convex ends 18 will seat against the concave shoulders 21. Preferably the fit against the shoulders is made tight, so that the blades will be held in lengthwise compression. The frames can then be reassembled by reinserting the pivot pin and the shears are ready for use.

Since the fingers 22 are resilient they will draw the blades tightly against the inner surfaces of the blade portions so that the blades will assume the curvature of the blade portions. Therefore during cutting, due to this construction and to the rake of the blades, as best indicated in Figures 5 to 10, the edges will move across each other in the proper manner to cut cleanly and efficiently. The ends of the blades may project beyond the frame members as shown in Figure 2 if desired when the blades are of heavy enough material to be substantially self-supporting. If lighter or thinner blades are to to be used, the blade portions may extend completely or almost completely to the ends of the blades to reinforce and stiffen them.

Since the blades are flat throughout their length and require no special curvature during their manufacture, they can be made very cheaply. They can also be interchanged quickly and easily on the frames so that when one set of blades becomes dull they can easily be discarded and replaced by new blades. In this way the shears are always ready for use without the delays incident to re-sharpening and at a cost less than the normal re-sharpening cost.

While one embodiment of the invention has been shown and described in detail, it will be understood that this is illustrative only and is not to be taken as a definition of the scope of the invention, reference being had for this purpose to the appended claim.

What is claimed is:

A pair of shears comprising a pair of elongated frame members with handle portions at one end and blade portions at the other end, a pivot pin extending through and pivotally interconnecting the frame members intermediate their ends, the blade portions having adjacent faces which are flat transverse of their length and concavely curved longitudinally, an elongated flexible blade which is normally flat fitting against the face of each blade portion, each blade portion having a recess formed in its face to receive a blade and terminating adjacent the pivot pin in a concavely shaped shoulder and having an opening therethrough remote from the pivot pin, each blade having a convexly shaped end to fit against the shoulder, and an integral finger on each blade lying generally parallel thereto and spaced therefrom, and extending toward the outer end of the blade to extend through the opening in a blade portion and over the opposite surface of the blade portion to secure the blade to the blade portion so that the blade will assume the curve of the blade portion, the blade being held in compression lengthwise between the shoulder and the integral fingers.

EDWARD A. VOGEL

References Cited in the file of this patent
UNITED STATES PATENTS

| Number | Name | Date |
|---|---|---|
| 1,609,638 | Zeidler | Dec. 7, 1926 |
| 1,627,197 | Patrick | May 3, 1927 |
| 1,671,569 | Boyd | May 29, 1928 |
| 1,748,701 | Boyd | Feb. 25, 1930 |
| 2,373,607 | Snell | Apr. 10, 1945 |